(No Model.)
W. O. TEGTMEYER.
BOX CORNER FASTENING.
No. 395,015. Patented Dec. 25, 1888.
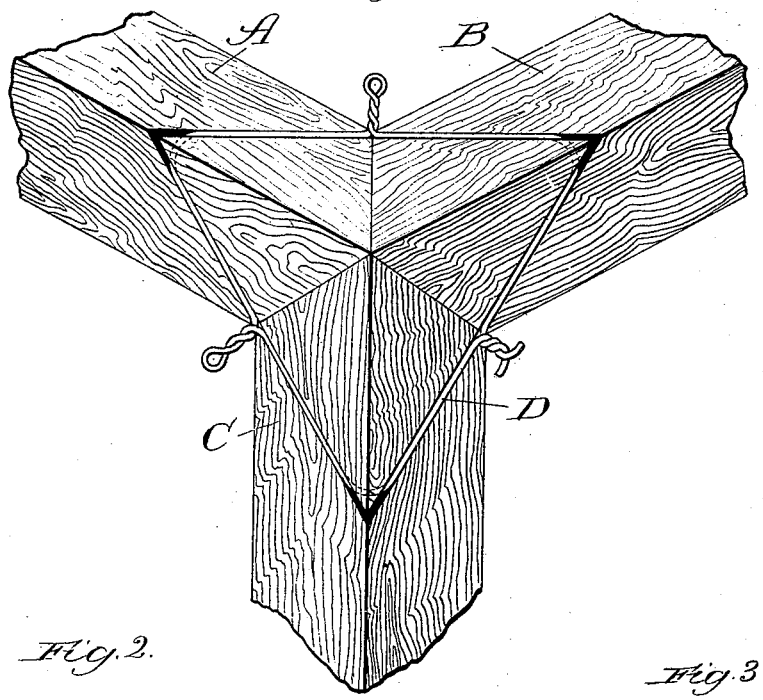
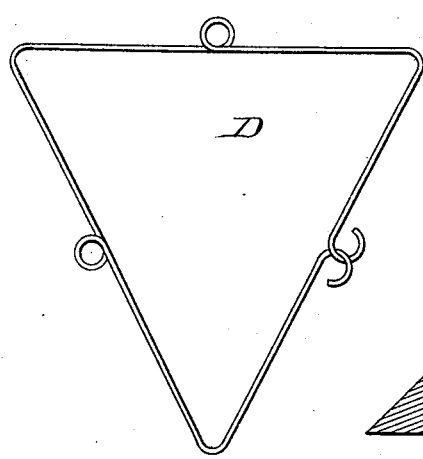
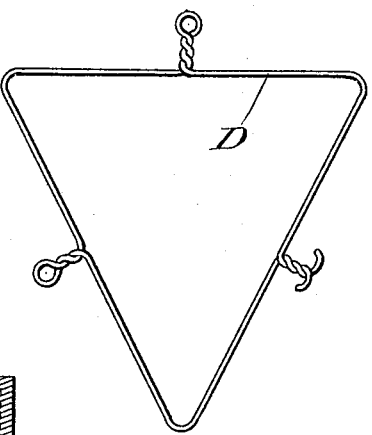
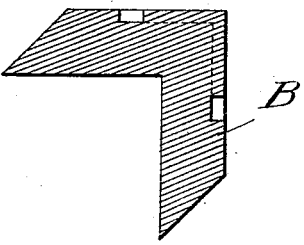
Witnesses:
Inventor:
William O. Tegtmeyer.
By Banning & Banning & Payson,
Att'ys

UNITED STATES PATENT OFFICE.

WILLIAM O. TEGTMEYER, OF CHICAGO, ILLINOIS.

BOX-CORNER FASTENING.

SPECIFICATION forming part of Letters Patent No. 395,015, dated December 25, 1888.

Application filed November 9, 1888. Serial No. 290,402. (No model.)

*To all whom it may concern:*

Be it known that I, WILLIAM O. TEGTMEYER, a citizen of the United States, residing at Chicago, Illinois, have invented a certain new and useful Improvement in Box-Corner Fastenings, of which the following is a specification.

The object of my invention is to make a wire fastening for the corners of boxes or other frames which are united by miter-joints and in which three members are arranged at right angles to each other; and my invention consists in the features and details of construction hereinafter described and claimed.

In the drawings, Figure 1 is a perspective view of three pieces, A, B, and C, united by a miter-joint and held in place by my improved wire fastener. Fig. 2 shows the wire fastener D ready to be applied. Fig. 3 shows it as it appears after being applied; and Fig. 4 is a section of one of the members of the joint, showing the groove in which the wire fastener is placed.

In making my improved wire fastener I take a piece of wire and bend it into a triangle with a loop or turn in each of its sides, including the loop at the ends of the wire as one. This triangle is made of a size to fit readily over the corner of a box and fall into a groove cut in the edges of the three members of the corners.

If desired, the groove may be extended entirely around, as shown in Fig. 4, or it may simply be made in the corners, as shown in Fig. 1.

In placing the wire fastener on the corner of a box or other frame composed of three members placed together in a miter-joint the apex of each of the angles of the fastener is placed at the edge of each one of the members forming the joint, as shown in Fig. 1. When thus placed, it falls into the groove prepared for it. An instrument of any suitable kind is then used to twist the wire at the three loops formed on the respective sides of the fastener. The wire at these loops is twisted enough to bring the fastener tightly against the members of the joint, so as to firmly and securely hold them in position.

If desired, the wire may be flattened at the three angles of the fastener, so as to prevent its cutting into the wood at the corners should soft wood be used for the members of the joint.

I prefer to make a loop at each side of the fastener, so that it will not be necessary to greatly twist the wire at any one of these loops, which will prevent the wire from breaking. If only one loop, for instance, be used, the wire will have to be twisted at that point enough to draw every part of the fastener firmly against the members of the joint, which will endanger the breaking of the wire. After the wire has become somewhat rusted in use, if it should be desired to tighten it, it can much more surely and readily be done where three loops are used than where a less number only are employed.

What I regard as new, and desire to secure by Letters Patent, is—

1. In combination with a three-way joint, a triangular wire fastener having loops on its sides to permit the wire of the fastener to be twisted at such loops and the fastener tightened on the joint, substantially as described.

2. In combination with a three-way miter-joint, a triangular wire fastener having loops on each of its sides, whereby the wire of the fastener may be twisted and the fastener tightened, substantially as described.

WILLIAM O. TEGTMEYER.

Witnesses:
THOMAS A. BANNING,
GEORGE S. PAYSON.